US009805509B2

(12) United States Patent
Shefi (10) Patent No.: US 9,805,509 B2
(45) Date of Patent: Oct. 31, 2017

(54) METHOD AND SYSTEM FOR CONSTRUCTING A VIRTUAL IMAGE ANCHORED ONTO A REAL-WORLD OBJECT

(71) Applicant: Yoav Shefi, Tel Aviv (IL)

(72) Inventor: Yoav Shefi, Tel Aviv (IL)

( * ) Notice: Subject to any disclaimer, the term of this patent is extended or adjusted under 35 U.S.C. 154(b) by 0 days.

(21) Appl. No.: 14/653,530

(22) PCT Filed: Nov. 26, 2014

(86) PCT No.: PCT/IL2014/051028
§ 371 (c)(1),
(2) Date: Jun. 18, 2015

(87) PCT Pub. No.: WO2015/079441
PCT Pub. Date: Jun. 4, 2015

(65) Prior Publication Data
US 2016/0260256 A1    Sep. 8, 2016

Related U.S. Application Data

(60) Provisional application No. 61/908,986, filed on Nov. 26, 2013.

(51) Int. Cl.
*G06T 19/00*     (2011.01)
*G06T 19/20*     (2011.01)
*G02B 27/00*     (2006.01)
*G02B 27/01*     (2006.01)
*G06F 3/01*      (2006.01)

(52) U.S. Cl.
CPC ........ *G06T 19/006* (2013.01); *G02B 27/0093* (2013.01); *G02B 27/0172* (2013.01); *G06F 3/017* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| 2002/0176636 | A1* | 11/2002 | Shefi | G06K 9/209 382/284 |
| 2009/0293012 | A1* | 11/2009 | Alter | G01C 21/20 715/810 |
| 2011/0261052 | A1 | 10/2011 | Shefi | |
| 2012/0007862 | A1 | 1/2012 | Shefi | |

* cited by examiner

*Primary Examiner* — Nicholas R Wilson
(74) *Attorney, Agent, or Firm* — Robert G. Lev (57) ABSTRACT

A system and method of generating a virtual image and displaying the virtual image so that the image appears to be anchored to a real world object. A data frame of spatial data obtained by one or more sensors is analyzed to determine whether one or more real-world objects to be detected is located in the data frame. If one of the real-world objects is in the data frame, the coordinates of a real-world reference point associated with the real-world object are determined. A virtual 3D space is generated and a base plane is constructed passing through a virtual object reference point in the virtual space. One or more planar content elements are placed on or parallel to the base plane. An image is formed in which the content elements appear to lie in a plane passing through the real-world reference point of the detected object.

28 Claims, 7 Drawing Sheets

METHOD AND SYSTEM FOR CONSTRUCTING A VIRTUAL IMAGE ANCHORED ONTO A REAL-WORLD OBJECT

PRIORITY INFORMATION

The present application claims priority as a national stage entry of PCT/IL2014/051028, filed on Nov. 26, 2014. The present invention also claims priority to U.S. Provisional Patent Application No. 61/908,986, filed on Nov. 26, 2013.

FIELD OF THE INVENTION

This invention relates to methods for displaying visual content on a display device.

BACKGROUND OF THE INVENTION

The following prior art references are considered to be relevant for understanding the background of the invention:
  https://developer.vuforia.com/resources/dev-guide/vuforia-ar-architecture
  https://developer.vuforia.com/resources/dev-guide/distance-target
  http://docs.opencv.org/trunk/modules/tracking/doc/tracking.html
  http://docs.opencv.org/trunk/modules/imgproc/doc/feature_detection.html
  http://www2.imm.dtu.dk/~aam/
  http://ils.intel-research.net/everyday-object-recognition
  https://software.intel.com/en-us/node/504462
  https://software.intel.com/en-us/node/504442
  http://docs.opencv.org/modules/contrib/doc/facerec/facerec_tutorial.html
  http://www.ri.cmu.edu/research_project_detail.html?project_id=448&menu_id=261
  http://www2.imm.dtu.dk/~aam/faces/
  http://kishordgupta.wordpress.com/2011/07/04/recognize-face-orientation-using-a-new-approach-based-on-eye-position-and-size-by-c/
  http://www.codeproject.com/Articles/26897/TrackEye-Real-Time-Tracking-Of-Human-Eyes-Using-a
  http://www.ncbi.nlm.nih.gov/pubmed/23239074
  http://gazeparser.sourceforge.net/
  http://thume.ca/projects/2012/11/04/simple-accurate-eye-center-tracking-in-opencv/

Computer screens and other two-dimensional (2D) surfaces are commonly used for displaying 2D visual content such as a page of text, a diagram or a Web site page. Some forms of visual content contain two or more content forms, such as a page consisting of text and diagrams, or a Web site page containing information related to the site and unrelated advertising. Usually, only one page is displayed on a screen at a time and the page is confined to the boundaries of the screen. The different elements in a page must therefore compete with each other for space and the viewer's attention, even if they are related to each other Existing Web site pages are therefore generally overcrowded by advertising and this is the major reason why Web advertising is presently considered ineffective.

Changing a displayed page (known as browsing or navigating) is a discontinuous process wherein an initially displayed page is removed from the screen and a second page is subsequently displayed. The ability to view only one page at a time makes it difficult for a viewer to know his location at a website and also creates uncertainty while navigating through the site. Changes in the size of a page is also done in discrete steps, and a return to the browser is required for each step change.

It is also known to arrange several pages in a virtual three-dimensional (3D) space and projecting a portion of the 3D space onto the 2D screen. A viewer may continuously navigate from page to page.

U.S. Pat. No. 8,035,635 to Shefi teaches a system and system for positioning content elements in a virtual 3D space. A 2D base plane is designated in the 3D space, and the visual content is positioned in the 3D space with at least one page being parallel to the base plane. A viewpoint and a viewing ray are selected in the 3D space from which to view the 3D space with the viewing ray being neither parallel nor perpendicular to the base plane. A 2D surface is then positioned in the 3D space so that the 2D surface intersects the view ray between the viewpoint and the base plane. At least a portion of the 3D space is then projected onto the 2D surface by a perspective projection determined by the viewing ray. The process may be repeated as desired each time optionally selecting a new viewpoint and/or selecting a new viewing ray and/or altering a property of one or more content elements. The projection onto the viewing surface may be displayed on a display device such as a computer monitor.

SUMMARY OF THE INVENTION

The present invention provides a system and method of generating a virtual image and displaying the virtual image so that the image appears to be anchored to a real world object. A data frame of spatial data obtained by one or more sensors is analyzed to determine whether one or more real-world objects to be detected is located in the data frame. If at least a portion of one of the real-world objects is in the data frame, the coordinates of a real-world reference point associated with the real-world object are determined from data in the data frame. A real-world viewing pyramid, a real-world view frustum, a real-world viewing surface, and a real world object reference point are determined from the data frame.

The data frame is used to generate a virtual 3D space in which the, and a virtual viewing pyramid, a virtual view frustum, a virtual viewing surface, and a virtual object reference point are positioned in the 3D virtual space. A base plane is then constructed passing through the virtual object reference point. One or more planar content elements are placed on or parallel to the base plane. The content elements positioned in the 3D virtual space are then projected onto the virtual viewing surface to form a projected image. A final image is then formed comprising the projected image and possibly at least a portion of the data frame. The final image is displayed via the viewing or display device. In the final image, the content elements appear to lie in a plane passing through the real-world reference point of the detected object.

Thus, in one of its aspects, the present invention provides a system for generating and displaying visual content comprising:
  a sensor set configured to obtain one or more data frames comprising spatial data of a 3D real-world space, the sensor set comprising one or more sensors, at least one sensor in the sensor set having an associated sensing field in the 3D real-world space and a sensor view ray, the sensor view ray being a vector extending from the sensor into the 3D real-world space in a 3D real-world coordinate system, at least one sensor in the sensor set having an associated up-vector that is fixed relative to the sensor, one or more of the sensor up-vectors defining an up-vector of a data frame;
a viewing or display device;
a computer processing unit comprising a processor and a memory, wherein:
the memory stores data indicative of one or more objects to be detected in a data frame, and further stores, for each object to be detected, a predetermined real-world reference point that is fixed relative to the object; and
the processor is configured to:
  analyze one or more the data frames and determine whether one or more of the real-world objects to be detected is in a current real-world view frustum;
  if at least a portion of one of the real-world objects is detected in the current frustum, determine from the current data frame the coordinates in the real-world of the real-world reference point associated with the detected real-world object in a real-world coordinate system associated with the real-world viewing frustum;
  determine a real-world object vector emanating from a predetermined point in the real-world viewing frustum, to the real-world reference point of the detected real-world object;
  determine a position of a gravitational vector associated with the data frame relative to the real-world viewing frustum;
  construct a virtual 3D space having a 3D virtual space coordinate system and position in the 3D virtual space a virtual viewing pyramid having an associated virtual world viewpoint, an associated virtual view frustum positioned symmetrically around a virtual view ray emanating from the virtual viewpoint, an associated virtual viewing surface forming a surface of the virtual view frustum and an associated virtual up vector where the x and y axes in a virtual coordinate system of the virtual up vector are parallel to the virtual viewing surface and the z axis is parallel to the virtual view ray;
  construct in the 3D virtual space a base plane passing through the virtual object reference point, the base plane having an associated 2D-coordinate system (x', z');
  place one or more planar content elements on the base plane or parallel to the base plane in any one or more predetermined permissible locations on the base plane;
  project the content elements positioned in the 3D virtual space onto the virtual viewing surface to form a projected image;
  form a final image the final image comprising the projected image; and
  display the final image the viewing or display device.
In another of its aspects, the invention provides a method for generating and displaying visual content comprising:
  analyzing one or more the data frames and determine whether one or more of the real-world objects to be detected is in a current real-world view frustum;
  if at least a portion of one of the real-world objects is detected in the current frustum, determining from the current data frame the coordinates in the real-world of the real-world reference point associated with the detected real-world object in a real-world coordinate system associated with the real-world viewing frustum;
  determining a real-world object vector emanating from a predetermined point in the real-world viewing frustum, to the real-world reference point of the detected real-world object;
  determining a position of a gravitational vector associated with the data frame relative to the real-world viewing frustum;
  constructing a virtual 3D space having a 3D virtual space coordinate system and position in the 3D virtual space a virtual viewing pyramid having an associated virtual world viewpoint, an associated virtual view frustum positioned symmetrically around a virtual view ray emanating from the virtual viewpoint, an associated virtual viewing surface forming a surface of the virtual view frustum and an associated virtual up vector where the x and y axes in a virtual coordinate system of the virtual up vector are parallel to the virtual viewing surface and the z axis is parallel to the virtual view ray;
  constructing in the 3D virtual space a base plane passing through the virtual object reference point, the base plane having an associated 2D-coordinate system (x', z');
  placing one or more planar content elements on the base plane or parallel to the base plane in any one or more predetermined permissible locations on the base plane.

BRIEF DESCRIPTION OF THE DRAWINGS

In order to understand the invention and to see how it may be carried out in practice, embodiments will now be described, by way of non-limiting example only, with reference to the accompanying drawings, in which:
FIG. 6 shows an embodiment of the invention in which a camera is associated with a user's mobile device, and the real-world reference point is fixed on the user's mobile device.

DETAILED DESCRIPTION OF THE INVENTION

Figure 1:
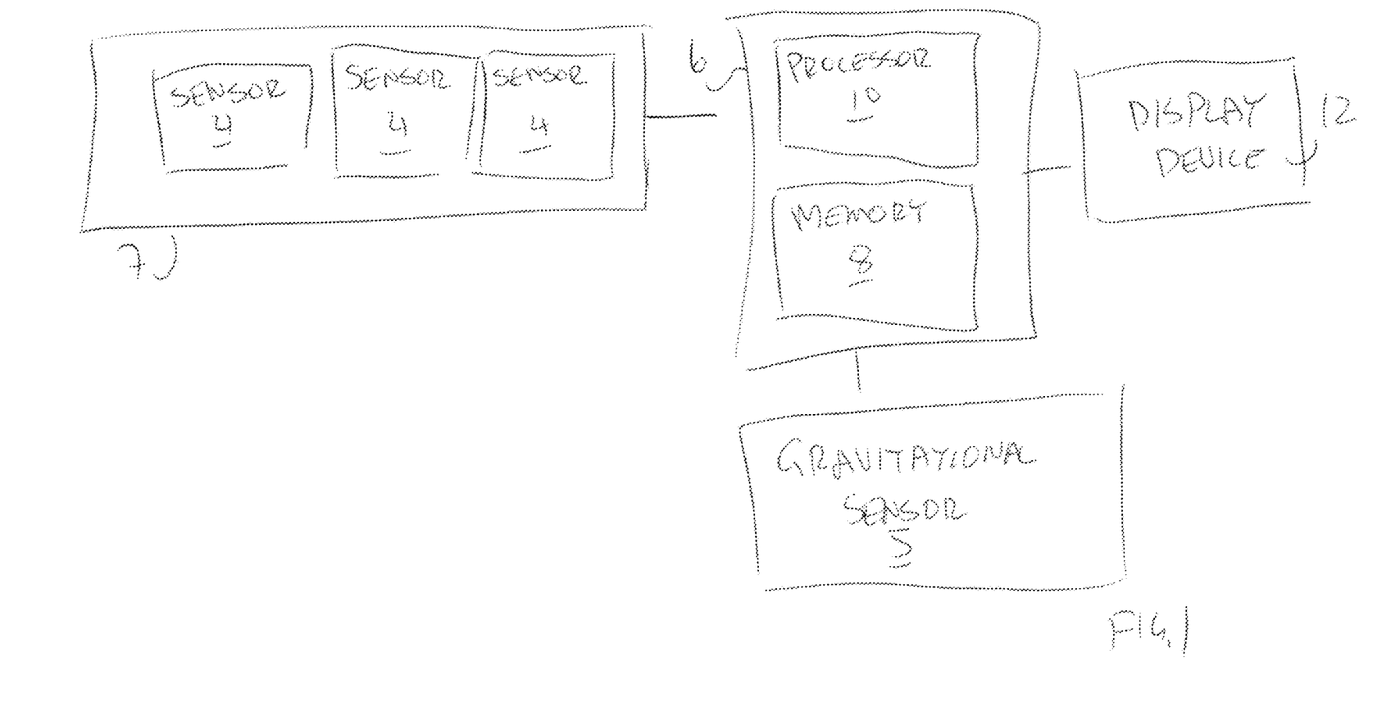
FIG. 1 shows schematically a system for displaying visual content in accordance with one embodiment of the invention.

FIG. 1 shows schematically a system 2 for displaying visual content in accordance with one embodiment of the invention. The system 2 comprises a sensor set 7 that obtains spatial data of a 3D real-world space. The sensor set 7 comprises one or more sensors 4. The sensors 4 may be may be, for example, any one or more of a 2D camera, a 3D camera, a GPS location transceiver, a sonar detector, a laser device, an infra-red detector, near field communication and a LIDAR device. Each sensor 4 has an associated sensing field in the 3D real-world space and a sensor view ray which is a vector extending from the sensor into the 3D real-world space in a 3D real-world coordinate system. The 3D real-world coordinate system may be fixed, for example, relative to one or more of the sensors or relative to a location and viewing direction of a user. Alternatively, the 3D real-world coordinate system may be an absolute coordinate system, for example, as provided by a GPS (geopositional system). Objects may move into and out of the sensor's sensing field as a result of either movement of the sensor, in the case of a mobile sensor, or as a result of movement of objects in the 3D real-world space. A sensor may be adapted to be worn by a user, for example, in a pair of goggles or other head mounted device, in which case the sensing field of the sensor approximates the wearer's field of view under a known analytical transformation. The sensing units may be directional or omnidirectional. In the case of omnidirectional sensing, a subsection of the sensor's field of view extending along and surrounding the sensor's viewing ray may be designated as a field of view compatible with the wearer's field of view. The spatial data obtained by the sensor set 7 at any instant is referred to herein as a "data frame". Data frames obtained by the sensor set 7 are input to a computer processing unit (CPU) 6. The CPU 6 comprises a memory 8 and a processor 10. Data frames obtained by the sensor set 7 are input to the CPU 6 and stored in the memory 8.

At least one sensor 4 in the sensor set 7 has an associated up-vector that is fixed relative to that sensor. The one or more up-vectors of the sensors are used to define an up-vector of the sensor set 7. The up-vector of the sensor set 7 determines an up-vector of each data frame.

Also stored in the memory 8 is data indicative of one or more objects to be detected in a data frame. The data indicative of one or more objects to be detected in a data frame may be, for example, a description of one or more objects in a predetermined list of objects, or data specifying criteria of object types to be detected in a data frame. For each object or object type to be detected, the memory 8, also stores a predetermined real-world reference point that is fixed relative to the object.

The processor 10 is configured to determine a real-world gravitational vector. In one embodiment, the system 2 comprises a gravitational sensor 5 that generates a time-dependent signal indicative of a current direction of the gravitational field that is input to the CPU 6 and stored in the memory 8. The gravitational signal is used to determine a gravitational vector of a data frame from the time at which the data frame was obtained. In another embodiment, the processor is configured to run software that analyzes data frames and determines the gravitational vector of a data frame from an analysis of the data frame.

As explained below, the processor 10 is configured to analyze one or more data frames that are used to construct a final image comprising heterologous (not included in the data frame) visual content elements that appear to be anchored to a real-world location. Analyzing consecutive data frames in a stream of data frames and constructing consecutive final heterologous visual content accordingly creates an appearance of content elements remaining anchored to a real-world location when that location moves in the user's field of view. The final image may also comprise data or images from the data frame. The final image is displayed via a viewing or display device 12. The display device may be, for example, a screen of any kind or an eye projector.

The system 2 may be a distributed system and one or more of the components of the system may communicate with each other via a wired or wireless network such a wired or wireless telephone network or computer communication network such as the Internet.

Figure 2:
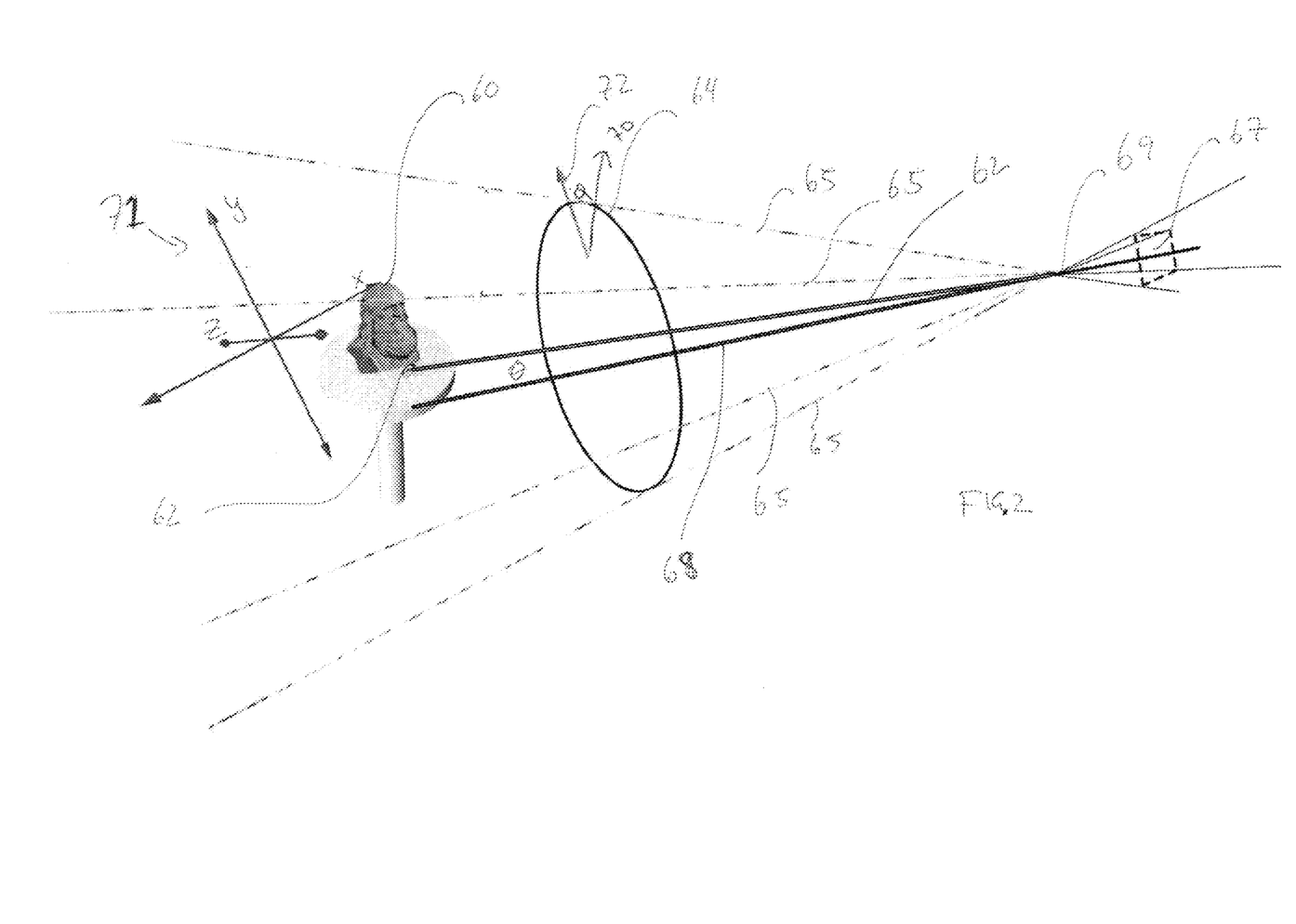
FIG. 2 shows a real-world object having an associated real-world reference point that has a fixed position relative to the real-world object.

FIG. 2 shows, as an example, a real-world object 60 having an associated real-world reference point 62 that has a fixed position relative to the real-world object 60. A sensor set comprising a camera (not shown in its entirety in FIG. 2) having a lens 64 with a focal point 69 is used to obtain data frames of a region of space including the real-world object 60. The focal point 69 and the lens 64 determine a real-world viewing volume, referred to herein as the "real-world viewing pyramid", that is fixed relative to the camera. The real-world viewing pyramid is bounded by rays emanating from the focal point 69 and passing through the edge of the lens 64. Four such rays are indicated in FIG. 2 by the phantom rays 65. The portion of the real-world viewing pyramid to the left of the lens 64 in FIG. 2 is referred to herein as the "real-world viewing frustum". The real-world viewing pyramid has an associated real-world viewing surface at the lens 64, and an associated real-world viewpoint at the focal point 69 of the camera that are fixed relative to the camera. The camera also has an associated real-world up vector 72 that is fixed relative to the camera. The camera has a real-world viewing ray 68 emanating from the focal point 69 and passing through the center of the viewing surface located at lens 64. A geometric ray 66 emanating from the view point 69 and passing through the real-world reference point 62 is referred to herein as the "object vector" of the real-world object 60. The camera obtains the current data frame as a 2D projection of the real-world frustum onto the real-world viewing surface at the lens 64 at least a portion of which is projected onto a 2D sensor array 67 (that may have a different shape than the shape of the lens) of the camera. The up-vector 72 of a sensor such as a camera, determines an up-vector of the data frame, the up-vector of the data frame being in the direction of the up-vector of the camera at the time that the data frame was obtained. FIG. 2 also shows a real-world coordinate system 71 which, in this example, is fixed relative to the camera. The real-world coordinate system 71 has an x-axis, a y-axis and a z-axis. The x-axis and the y-axis are parallel to the viewing surface to the lens 64, and the z-axis is parallel to the viewing ray 69. Also shown in FIG. 2 is a real-world gravitational vector 70, determined as explained above. The image formed on the camera sensor array 67 and the up-vector of the data frame are input to the CPU 6 and stored in the memory 8.

Figure 3:
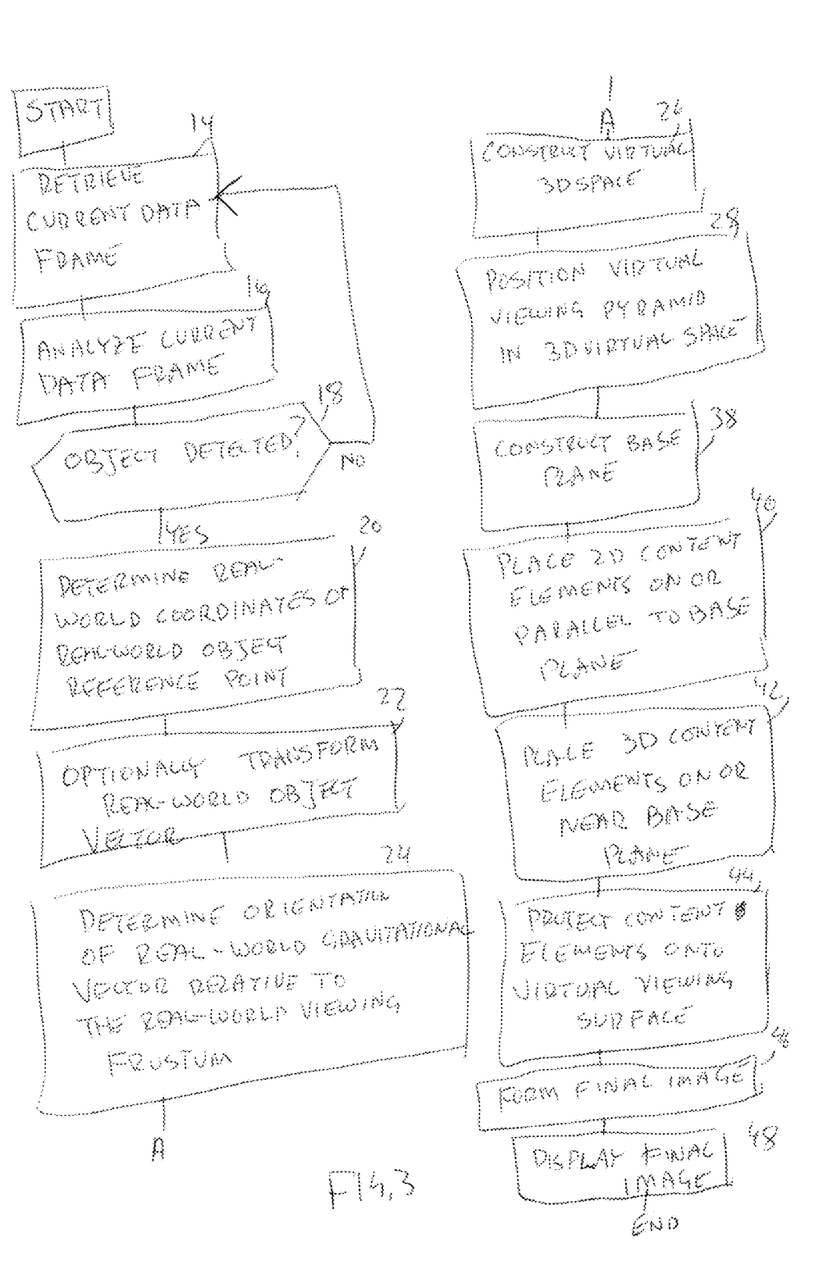
FIG. 3 shows a flow chart for a method of analyzing data frames, generating an image and displaying the image, in accordance with one embodiment of the invention.

FIG. 3 shows a flow chart for a method of analyzing data frames, generating an image and displaying the image, in accordance with one embodiment of the invention. In step 14, a current data frame is retrieved from the memory 8 and input to the processor 10. The processor 10 in step 16 analyzes the current data frame and in step 18 determines whether one or more of the real-world objects to be detected is located in the current data frame. If an object to be detected is not detected in the current data frame, then the process returns to step 14 with the retrieval of a new current data frame. If, at step 18, at least a portion of one of the real-world objects (for example the real-world object 60 in FIG. 2) is in the current data frame, then in step 20, the processor 10 determines from the current data frame the coordinates of the real-world reference point associated with the real-world object (for example the real-world reference point 62 in FIG. 2) in a real-world coordinate system associated with the real-world viewing frustum. The real-world object vector (66 in FIG. 2) emanates from a predetermined point in the real-world viewing frustum, such as the view point (69 in FIG. 2) to the real-world reference point. In step 22, the processor may optionally transform the real-world object vector by a predetermined transformation which takes into account any predetermined relationship between the real-world view ray and a user's view ray. This would be useful, for example, if a sensor is mounted on headgear so that the real-world view ray of the sensor is in a fixed relation to the user's view ray. In this case, the user's view ray can be used as the real-world view ray.

In step 24, the processor determines the position of the gravitational vector associated with the data frame relative to the real-world viewing frustum. The processor then constructs a virtual 3D space having a 3D virtual space coordinate system (x,y,z) (step 26). The processor, in step 28, positions in the 3D virtual space a virtual viewing pyramid having an associated virtual world viewpoint, an associated virtual view frustum positioned symmetrically around a virtual view ray emanating from the virtual viewpoint, an associated virtual viewing surface forming a surface of the virtual view frustum and an associated virtual up vector where the x and y axes of the up vector are parallel to the virtual viewing surface and the z axis is parallel to the virtual view ray. The 3D virtual space is constructed using a predetermined continuous mapping G that maps the real-world viewing pyramid into the virtual viewing pyramid, the real-world viewpoint onto the virtual world viewpoint, the real world view ray onto the virtual world view ray, the real-world view frustum into the virtual view frustum, the real-world viewing surface onto the virtual viewing surface such that the virtual world view surface is parallel to the virtual world x and y axes and the virtual world view ray is parallel to the virtual world z axis, the real-world gravitational vector to the virtual gravitational vector, and the real-world up vector onto the virtual up vector. The mapping G is preferably selected so that the angle θ between the real-world object vector and the real-world view ray (see FIG. 2) is equal to the angle between the virtual world object vector and the virtual view ray and furthermore, so that the angle φ between the real-world up-vector and the real-world gravitational vector (see FIG. 2) is equal to the angle between the virtual world up-vector and the virtual world gravitational vector.

Figure 4:
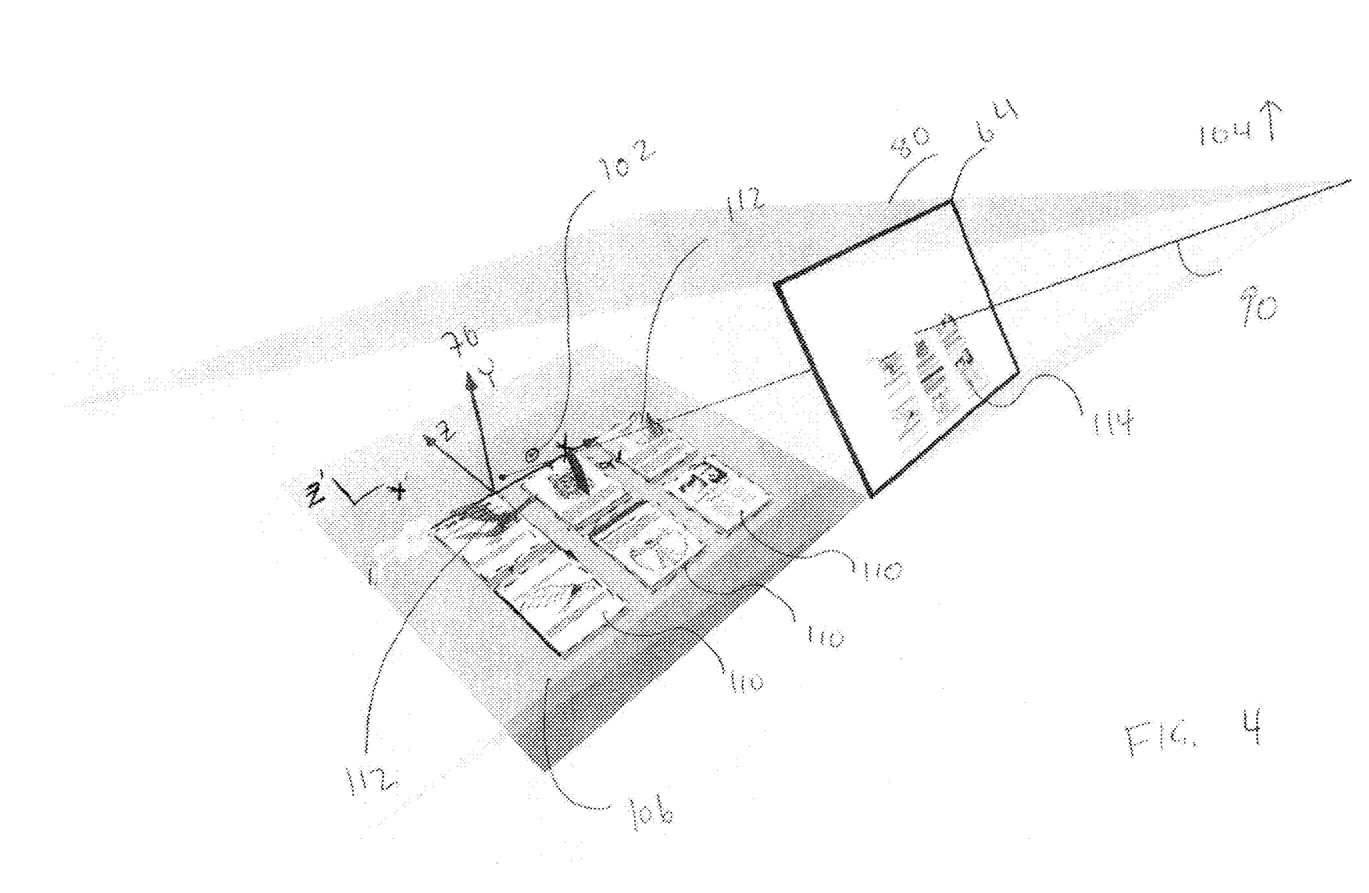
FIG. 4 shows a base plane having an associated 2D-coordinate system (x', z')

The processor, in step 38, then constructs in the 3D virtual space a base plane passing through the virtual object reference point. As shown in FIG. 4, the base plane 106 has an associated 2D-coordinate system (x', z'). The base plane may be positioned in the 3D virtual space as follows: (1) The x' axis of the base plane is parallel to the x axis of the virtual space, (2) The angle between the x' axis of the base plane and the y axis of the virtual space coordinate system may be a predetermined angle, for example 90°, or may be equal to sum of a predetermined angle (preferably 90°) and the angle between the projection of the gravitational vector on the xy plane and the positive y axis. (3) The angle α between the z' axis and the z axis is determined from the angle β' between the virtual viewing ray and the virtual gravitational vector. For β'<β where β is a predetermined constant threshold (for example 20°), α is a continuous, strictly monotonically increasing function of β'. For β'≥β, α is a constant equal to the limit of α as β' approaches β from below.

Alternatively, the base plane may be positioned "sideways" in the virtual space such that (1) The z' axis of the base plane is parallel to the y axis of the y plane, (2) The angle between the z' axis of the base plane and the y axis of the virtual space coordinate system may be a predetermined angle, for example 90°, or may be equal to sum of a predetermined angle and the angle between the projection of the gravitational vector on the xy plane and the positive y axis. (3) The angle α between the x' axis and the z axis is determined from the angle β' between the virtual viewing ray and the virtual gravitational vector. For β'<β where β is a predetermined constant threshold (for example 20°), α is a continuous, strictly monotonically increasing function of β'. For β'≥β, α is a constant equal to the limit of α as β' approaches from below.

The base plane has one or more associated permissible locations, indicated by phantom lines in FIG. 4, where one or more planar content objects can be positioned on the base plane. At least one of the permissible locations is a rectangle having sides that are parallel to the x' and z' axes of the base plane coordinate system. The permissible locations may be arranged in a grid of parallel rows and columns. When a content element has an inherent top edge and bottom edge, for example, when the content element includes a picture or text, the up-down direction of the content element is best positioned in the base plane with the up-down direction aligned to the z' axis of the base plane. The processor, in step 40, then places one or more planar content elements 110 on the base plane 106 or parallel to the base plane 106 in any one or more of the permissible locations. The processor may also position on or near the base plane one or more 3D content elements that may be rotated 2D content elements or volumetric content elements such as 3D models or volumetric maps (step 42).

Figure 5:
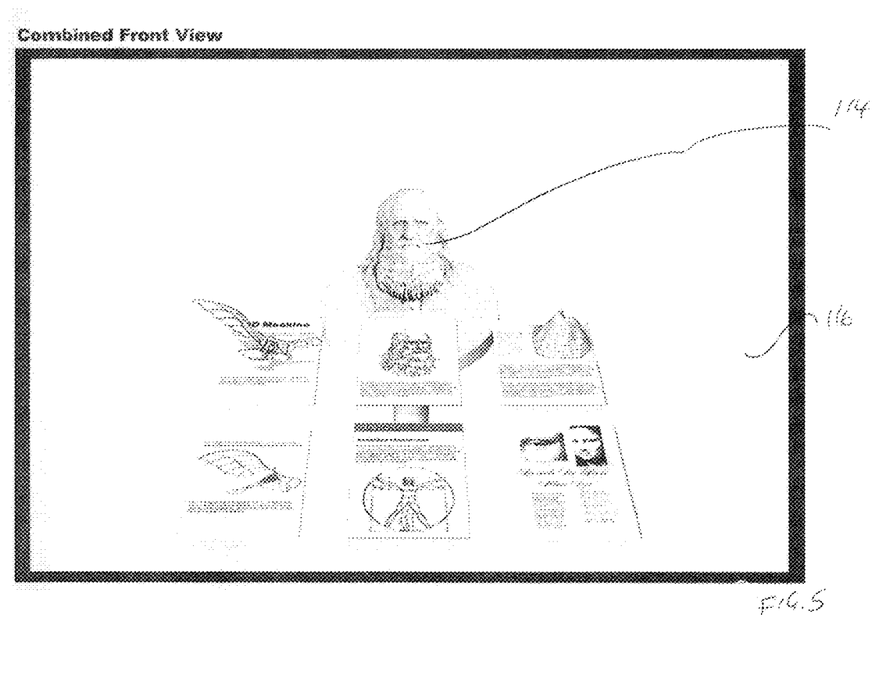
FIG. 5 shows a final image that includes a projected image and an image of a real-world object.

The processor then projects the content elements positioned in the 3D virtual space onto the virtual viewing surface 64 to form a projected image 114 (step 44). The projection of the content elements onto the 3D virtual viewing surface may be, for example, by a perspective projection. A final image is then formed (step 46), where the final image comprises the projected image 114 and possibly at least a portion of the data frame. FIG. 5 shows a final image 116 that includes the projected image 114 and an image of the real-world object 60. The final image is displayed via the viewing or display device (step 48), and the process terminates.

Figure 7:
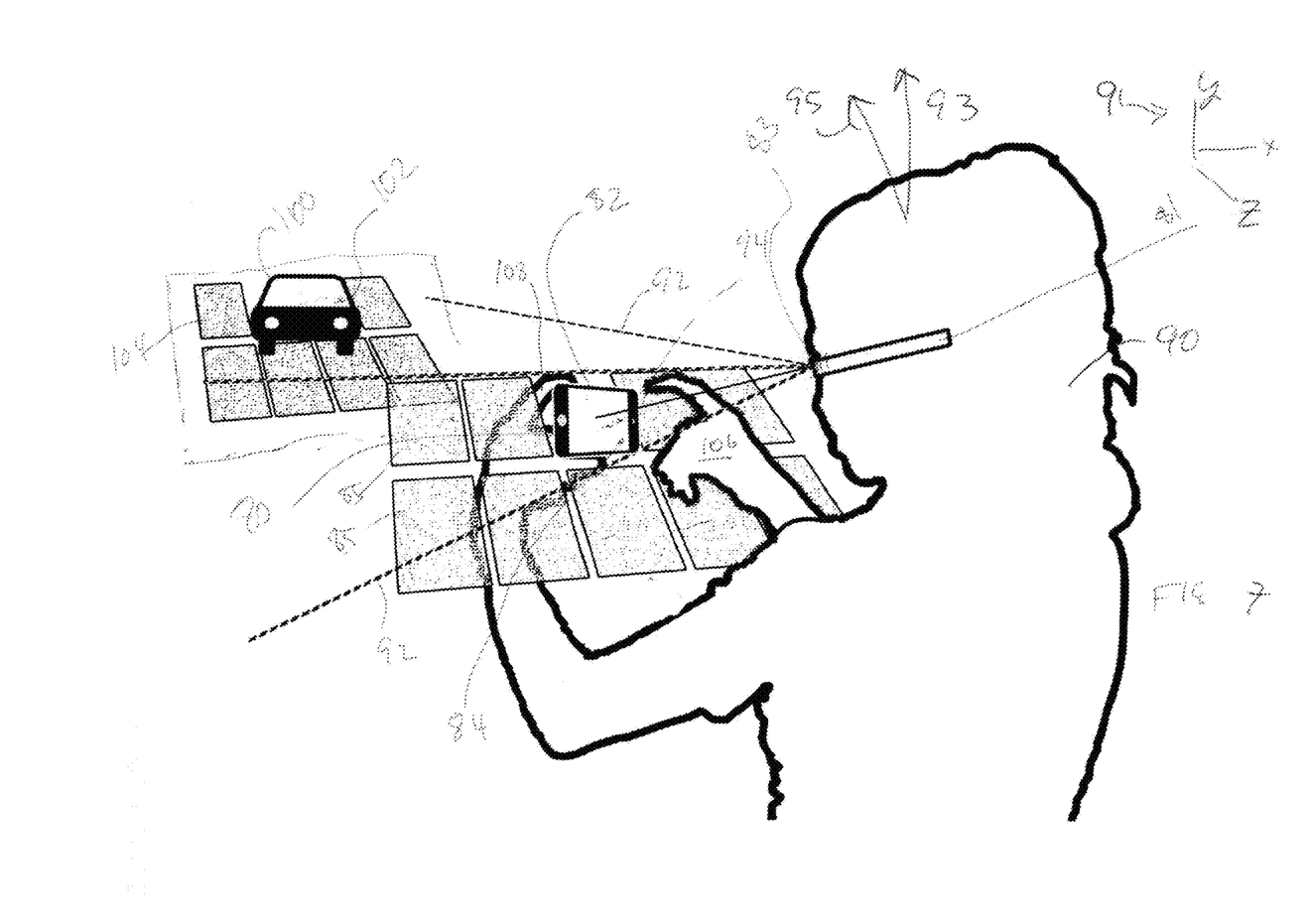
FIG. 7 shows the user's real-world viewing pyramid in the embodiment of FIG. 6.
Figure 9B:
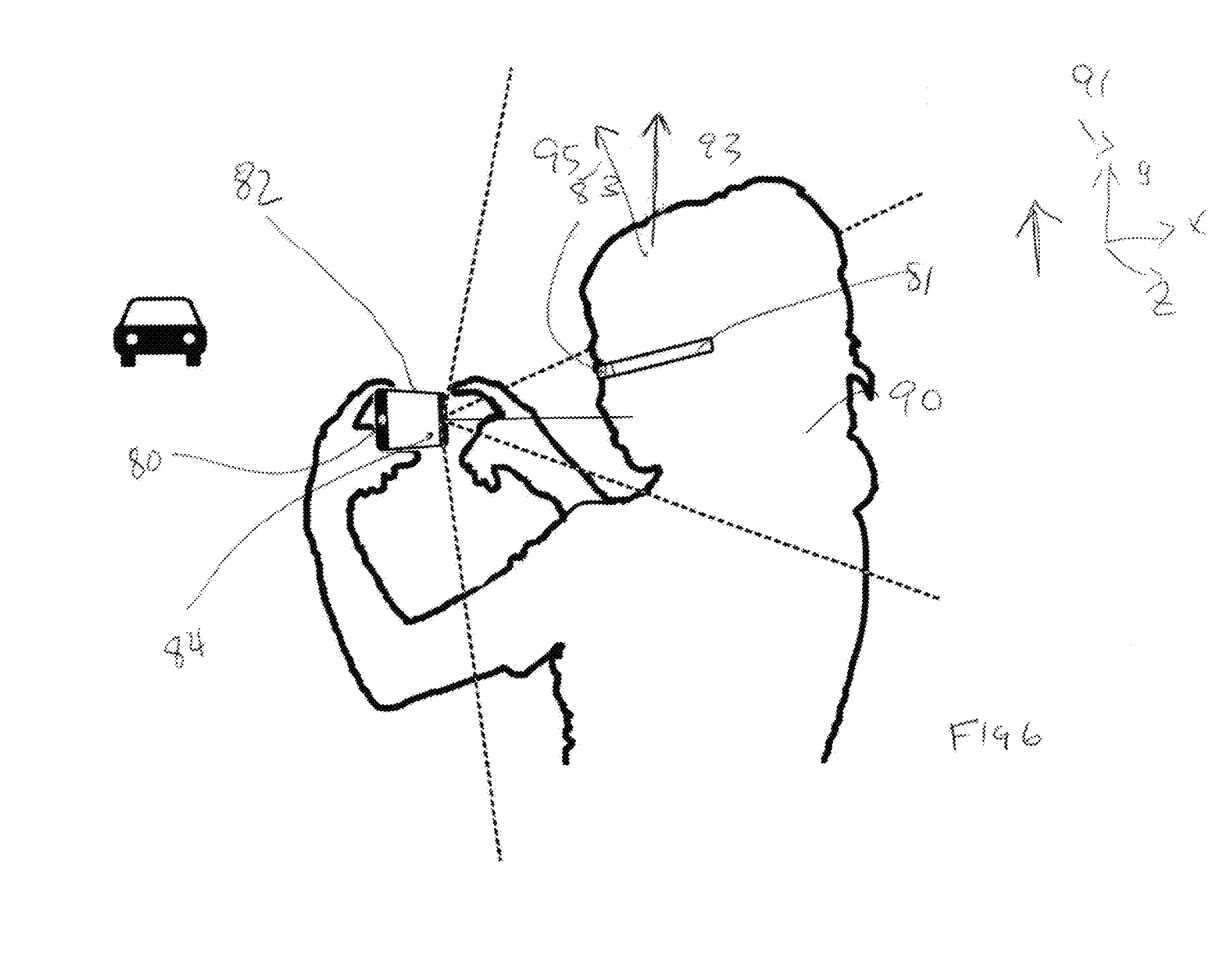

FIG. 6 shows another embodiment in which a camera 80 is associated with a user's mobile device 82, and the real-world reference point 84 is fixed on the user's mobile device 82. The camera 80 has viewing pyramid indicated in FIG. 6 by phantom rays. The camera 80 is manipulated to obtain a current data frame that includes the user's face. The user 90 is wearing a head mounted device 81 that includes a display device 83 that may be an eye projector or a display screen. In the embodiment of FIG. 6, the processor, which may be located in the mobile device 82 or in the head mounted device 81, is configured to identify a human face in a data frame obtained by the camera 80. The processor 10 is also configured, when a user's face is detected in a data frame, to determine the user's real-world viewing pyramid. FIG. 7 shows the user's real-world viewing pyramid which is indicated by bounding phantom rays 92. The processor 10 is also configured to determine the user's real-world viewpoint, the user's real-world up-vector 95 the user's real-world viewing surface, and the user's real-world viewing ray 94 emanating from the user's real world view point and passing through the center of the user's real-world viewing surface. A ray emanating from the user's view real-world viewpoint and passing through the real-world reference point 84 is the object vector of the real-world object 82. FIGS. 6 and 7 also show a real-world coordinate system 91 which, in this example, is fixed relative to the user's head. The real-world coordinate system 91 has an x-axis, a y-axis and a z-axis. The x-axis and the y-axis are parallel to the user's viewing surface, and the z-axis is parallel to the user's viewing ray 94. Also shown in FIGS. 6 and 7 is a real-world gravitational vector 93, determined as explained above.

The user's real-world viewing pyramid, real-world viewing frustum, real-world viewpoint, real-world up-vector, real-world viewing surface, and real-world viewing ray and real-world object vector are used in the process of described above in reference to FIG. 3. As a result of the processing, virtual content elements 85 are presented to the user by the display device 83 of the head mounted 81, at least some of the virtual content elements are planar content elements that appear to lie on a base plane passing through the reference point 84.

Referring still to FIG. 7, the processor 10 may be configured to detect a spatial location of user's hand 106 and/or 108 in a data frame. In this case, the processor is further configured to determine when a portion of the hand falls within the virtual view frustum between the virtual viewing surface and any content elements positioned in accordance with the invention. The processor can be configured to eliminate from the projected content those regions that are obscured by the portion of a hand. Thus for example, portions of the content elements 85 obscured by the hand 106 have been eliminated from the content elements. The processor 10 may be configured to identify a predetermined hand or finger gesture performed by one or both of the hands 106 and 108, and to execute a predetermined command associated with the identified gesture. If, for example, the predetermined real-world object is an electronic device having a screen, the command may be a command to move one or more content elements from the screen onto a base plane. In yet another example of the processor identifies gesture of touching an interactive content with a clicking action that content action shall be activated and incurs a change in base plane content.

Referring still to FIG. 7, a secondary real-world object to be detected, such as the object 100, may be present in the user's view frustum. The object 100 has an associated real-world reference point 102. One or more data frames containing the object 100 may be obtained by a sensor that may be located in the mobile device 82 and facing the object 102, or a sensor mounted on the head mounted device 81. The data frame containing the object 100 can be analyzed as explained above in reference to FIG. 3. As shown in FIG. 7, content elements 104 positioned on a base plane can be presented to the user by the head mounted display device 83 or by the screen of the mobile device 82, where the base plane appears to the user to pass through the reference point 102. Two base plans are thus presented to the user, and content elements can be moved from one base plane to the other if desired. Furthermore the processor 10 may be further configure to recognize a user gesture or command which shall result in a portion of one base plane content being transferred from one object to the other thus appearing now as part of the other object's base plane. Yet furthermore if the object is a 'smart object' i.e. capable of network communication then the above transfer of content from user device's own base plane over to object 100 base may become persistent such when the object 100 is either accessed through the network or viewed by a new user with similar devices according to the invention the transferee content remains visible.

The invention claimed is:

1. A system for generating and displaying visual content comprising:
    a sensor arrangement configured to obtain one or more data frames comprising spatial data of a 3D real-world space, the sensor arrangement comprising at least one sensor, each of said at least one sensor having an associated sensing field in the 3D real-world space and a sensor view ray, the sensor view ray being a vector extending from said at least one sensor into the 3D real-world space in a 3D real-world coordinate system, each said at least one sensor in the sensor arrangement having an associated up-vector that is fixed relative to said sensor, one or more of the sensor up-vectors defining an up-vector of a data frame;
    a display device;
    a computer processing unit comprising a processor and a memory, wherein: the memory stores data indicative of one or more objects to be detected in a data frame, and further stores, for each object to be detected, a predetermined real-world reference point and real-world object vector that is fixed relative to the object; and the processor is configured to:
    a) analyze the one or more data frames including a current data frame and determine whether one or more of the real-world objects to be detected is in a current real-world view frustum of the current data frame;
    b) when at least a portion of one of the real-world objects is detected in the current real-world view frustum, determine from the current data frame the coordinates in the 3D real-world coordinate system of the predetermined real-world reference point associated with the detected real-world object in the 3D real-world coordinate system associated with the current real-world viewing frustum;
    c) determine a real-world object vector emanating from a predetermined point in the real-world viewing frustum, to the predetermined real-world reference point of the detected real-world object;
    d) determine a current position of a current real-world gravitational vector associated with the current data frame relative to the real-world viewing frustum;
    e) construct a virtual 3D space having a virtual 3D space coordinate system, and position in the virtual 3D space a virtual viewing pyramid having an associated virtual world viewpoint, and an associated virtual view frustum positioned symmetrically around a virtual view ray emanating from the virtual viewpoint, an associated virtual viewing surface forming a surface of the virtual view frustum, an associated virtual up vector where x and y axes in a virtual coordinate system of the virtual up vector are parallel to the virtual viewing surface and a z axis in the virtual coordinate system is parallel to the virtual view ray, wherein a virtual world object vector extends from a virtual object reference point in the virtual 3D space, so that an angle 6 between the virtual world object vector and the virtual view ray is equal to an angle between the real-world object vector and the real-world sensor view ray;
    f) construct in the virtual 3D space a base plane passing through the virtual object reference point, the base plane having an associated 2D-coordinate system (x', z');
    g) place one or more planar content elements on the base plane or parallel to the base plane in any one or more predetermined permissible locations on the base plane;
    h) project the planar content elements positioned in the 3D virtual 3D space onto the virtual viewing surface to form a projected image;
    i) form a final image the final image comprising the projected image; and,
    j) display the final image on the display device.
2. The system according to claim 1 wherein the 3D virtual 3D space is constructed using a predetermined continuous mapping G that maps a real-world viewing pyramid into the virtual viewing pyramid, a real-world viewpoint onto the virtual world viewpoint, a real world view ray onto the virtual world view ray, the current real-world view frustum into the virtual view frustum, the current real-world gravitational vector to a virtual gravitational vector, the real-world up vector onto the virtual up vector, and the real-world viewing surface onto the virtual viewing surface.

3. The system according to claim 2 wherein the mapping G is selected so that:
   a) an angle $\theta$ between a real-world object vector and the real-world view ray is equal to an angle between the virtual world object vector and the virtual view ray; and,
   b) an angle $\phi$ between the real-world up-vector and the real-world gravitational vector is equal to an angle between the virtual world up-vector and the virtual world gravitational vector.

4. The system according to claim 1 wherein the processor is further configured to transform the real-world object vector by a predetermined transformation which takes into account a predetermined relationship between the real-world view ray and a user's view ray.

5. The system according to claim 1 wherein the base plane is positioned in the 3D virtual space such that (1) the x' axis of the base plane is parallel to the x axis of the virtual space; (2) an angle between the x' axis of the base plane and the y axis of the virtual space coordinate system is either a predetermined angle or is equal to a sum of a predetermined angle and an angle between the projection of the gravitational vector on an xy plane and a positive y axis; and (3) an angle $\alpha$ between the z' axis and the z axis is determined from the angle $\beta'$ between the virtual viewing ray and the virtual gravitational vector.

6. The system according to claim 5, for $\beta' \leq \beta$; where $\beta$ is a predetermined constant threshold, $\alpha$ is a continuous, strictly monotonically increasing function of $\beta'$, $\alpha(\beta')$ and for $\beta' \geq \beta$, $\alpha$ is a constant equal to $\alpha(\beta)$.

7. The system according to claim 1 wherein the base plane is positioned in the virtual space such that:
   (1) the z' axis of the base plane is parallel to the y axis of an xy plane;
   (2) an angle between the z' axis of the base plane and the y axis of the virtual space coordinate system is a predetermined angle or is equal to a sum of a predetermined angle and an angle between a projection of the gravitational vector on the xy plane and a positive y axis; and,
   (3) an angle $\alpha$ between the x' axis and the z axis is determined from an angle $\beta'$ between the virtual viewing ray and the virtual gravitational vector.

8. The system according to claim 1 wherein permissible locations on the base plane are arranged in a grid of parallel rows and columns.

9. The system according to claim 1 wherein the processor is further configured to position on or near the base plane one or more 3D content elements.

10. The system according to claim 1 wherein the projection of the planar content elements onto the virtual viewing surface is by a perspective projection.

11. The system according to claim 1 wherein the final image includes at least a portion of the current data frame.

12. The system according to claim 1 wherein one or more of the sensors is selected from the group consisting of a 2D camera, a 3D camera, a GPS location transceiver, a sonar detector, a laser device, an infra-red detector, near field communication signal and a LIDAR device.

13. The system according to claim 1 wherein data indicative of the one or more objects to be detected in a data frame is a description of one or more objects in a predetermined list of objects, or data specifying criteria of object types to be detected in a data frame.

14. The system according to a claim 1 further comprising a gravitational sensor adapted to generate a time-dependent signal indicative of a current direction of a gravitational field that is used to determine a gravitational vector of a data frame in the one or more data frames obtained by said sensor arrangement from a time at which the data frame was obtained.

15. The system according to claim 1 wherein the processor is further configured to run software that analyzes the one or more data frames and determines the gravitational vector of a data frame in the one or more data frames from an analysis of the data frame.

16. The system according to claim 1 wherein the system is a distributed system and two or more components of the system communicate with each other via a wired or wireless network.

17. The system according to claim 1 wherein at least one sensor is associated with a mobile communication device and the predetermined real-world reference point is fixed on the mobile device.

18. The system according to claim 17 further comprising a head mountable device comprising the display device.

19. The system according to claim 18 wherein the processor is further configured to identify a human face in a data frame from the one or more data frames obtained by the sensor associated with the mobile communication device, and the processor is further configured, when a face of a user is detected in a data frame, to determine a real-world viewing pyramid of the user.

20. The system according to claim 19 wherein the processor is further configured to determine a real-world viewpoint of the user, a real-world up-vector of the user, a real-world viewing surface of the user, and a real-world viewing ray of the user emanating from the real world view point of the user and passing through a center of the real-world viewing surface of the user, a ray emanating from a predetermined point in the real-world view pyramid of the user and passing through the predetermined real-world reference point fixed on the mobile communication device.

21. The system according to claim 20 wherein the real-world viewing pyramid of the user is the a real-world viewing pyramid, the real-world viewing frustum of the user is the real-world viewing frustum, the real-world viewpoint of the user is the a real-world viewpoint, the real-world up-vector of the user is the real-world up-vector, the real-world viewing surface of the user is the a real-world viewing surface, the real-world viewing ray of the user is the a real-world viewing ray and the real-world object vector of the user is the real-world object vector.

22. The system according to claim 17 wherein the processor is further configured to:
   detect one or more additional real-world objects to be detected in a current real-world view frustum;
   generate an additional base plane in the virtual space passing through the virtual reference point transformed from the real-world reference point of the additional real-world object;
   position additional planar content elements on the additional base plane;
   project the additional content elements on the viewing surface to form an additional projected image; and
   display the projected image on the display device.

23. The system according to claim 22 wherein the processor is configured to receive a command to transfer the planar content elements from the base plane to the additional base plane.

24. The system according to claim 1 wherein the processor is further configured to detect a spatial location of one or both of a hand of a user and a contour of the hand of the user in a data frame from the one or more data frames.

25. The system according to claim 24 wherein the processor is further configured to determine when a portion of the hand of the user falls within the virtual view frustum between the virtual viewing surface and the planar content elements positioned on the base plane.

26. The system according to claim 25 wherein the processor is further configured to eliminate from the projected content any regions that are obscured by a portion of a hand.

27. The system according to claim 25 wherein the processor is further configured to identify a predetermined hand or finger gesture performed by one or more hands to execute a predetermined command associated with the identified gesture.

28. A method for generating and displaying visual content comprising:
   a) analyzing one or more data frames and determining whether one or more of selected real-world objects to be detected is in a current real-world viewing frustum of a current data frame from the one or more data frames;
   b) when at least a portion of one of the real-world objects is detected in the current real-world viewing frustum, determining from the current data frame coordinates in a 3D real-world coordinate system of a real-world reference point associated with the detected real-world object in the 3D real-world coordinate system associated with the current real-world viewing frustum;
   c) determining a real-world object vector emanating from a predetermined point in the current real-world viewing frustum to the real-world reference point of the detected real-world object, and determining a real-world sensor view ray;
   d) determining a current position of a current real-world gravitational vector associated with the current data frame relative to the current real-world viewing frustum;
   e) constructing a virtual 3D space having a 3D virtual space coordinate system and position in the 3D virtual space a virtual viewing pyramid having an associated virtual world viewpoint, an associated virtual view frustum positioned symmetrically around a virtual view ray emanating from the virtual viewpoint, an associated virtual viewing surface forming a surface of the virtual view frustum, an associated virtual up vector where x and y axes in a virtual coordinate system of the virtual up vector are parallel to the virtual viewing surface and a z axis in the 3D virtual space coordinate system is parallel to the virtual view ray, wherein a virtual world object vector extending from a virtual object reference point in the 3D virtual space, so that an angle $\theta$ between the virtual world object vector and the virtual view ray is equal to an angle between the real-world object vector and the real-world sensor view ray;
   f) constructing in the 3D virtual space a base plane passing through the virtual object reference point, the base plane having an associated 2D-coordinate system (x', z');
   g) placing one or more planar content elements on the base plane or parallel to the base plane in any one or more predetermined permissible locations on the base plane;
   h) projecting the planar content elements positioned in the 3D virtual space onto the virtual viewing surface to form a projected image;
   i) forming a final image the final image comprising the projected image; and,
   j) displaying the final image on a display device.

* * * * *